Patented May 2, 1939

2,156,737

UNITED STATES PATENT OFFICE 2,156,737

PROCESS OF PREPARING OCTADECADIENE ACID

Remmet Priester, Deventer, Netherlands, assignor to Naamlooze Vennootschap Noury & Van Der Lande's Exploitatiemaatschappij, Deventer, Netherlands, a company of the Netherlands No Drawing. Application May 9, 1936, Serial No. 78,922

17 Claims. (Cl. 260—413)

The present invention relates to the preparation or production of unsaturated fatty acids of the type containing two double bonds and to the preparation of an intermediate product from which said unsaturated fatty acids may be derived.

More particularly stated, the present invention relates to a process for the preparation of 9,11-octadecadiene 1-acid from ricinoleic acid, according to which process it is possible to very efficiently and effectively convert ricinoleic acid into 9,11-octadecadiene 1-acid and to obtain the practically pure 9,11-octadecadiene 1-acid.

The term "ricinoleic acid", as used above and in the following parts of the description and in the claims, is intended to embrace pure ricinoleic acid, ricinoleic acid in admixture with other bodies occurring normally in association therewith, fatty acids obtained from castor oil and known as castor oil fatty acids, which castor oil fatty acids comprise ricinoleic acid, as well as ricinoleic acid derived from any source or produced by any method of preparation.

The castor oil fatty acids to be used in the process of the present invention, may be produced by the splitting up of castor oil. It is immaterial, whether the splitting is effected by means of alkalies, the so-called Twitchell's reagent, or of a ferment or by another method. The technical product known as castor oil fatty acids may contain a certain percentage of unsplit oil; moreover, by the heating involved in the splitting process, chemically bound water may be driven out from the castor oil or from the castor oil fatty acids. It is to be understood, that the products formed in these various reactions may be present in the starting material to be used for preparing 9,11-octadecadiene 1-acid according to the process of the invention. Furthermore it is possible to subject castor oil to a heating process, e. g. at a temperature of 200° to 300° C. with or without a catalyst, by which heating process a certain amount of chemically bound water is driven out, to split the product thus obtained e. g. by means of alkalies or by another method, and to use the fatty acids manufactured in this way in the process of the invention. All of these forms of castor oil fatty acid are intended to be included in the terms "ricinoleic acid" used in the appended claims.

According to the present invention ricinoleic acid is subjected to a heating operation. In its simplest form this heating operation consists in heating ricinoleic acid at a temperature of above 270° C. for a period of time long enough to convert it into 9,11-octadecadiene 1-acid. I prefer to perform this heating operation at a temperature of 290–315° C., because better yields and purer products are obtained at these temperatures. By heating ricinoleic acid at the above-mentioned temperatures and under reduced pressure, practically pure 9,11-octadecadiene 1-acid distills from the mass being heated as it is formed and may be condensed in the usual way. Preferably the distillation process is carried out under a pressure not surpassing 30 mm. of mercury absolute.

I have found, however, that the formation of 9,11-octadecadiene 1-acid from ricinoleic acid takes place at a faster speed and that the 9,11-octadecadiene 1-acid is obtained in a still higher degree of purity, if the above described heating operation is preceded by another heating process. This treatment prior to the heating operation that yields 9,11-octadecadiene 1-acid, is carried out at a temperature below 260° C., for example at 250° C. Thus in the preferred form of my invention ricinoleic acid is subjected to two successive regulated heating operations.

The way in which these successive heating operations are carried out and the theoretical outlines of the reactions that are supposed to take place during the heating processes, will be explained in detail in the following lines.

I have found that by the first of these heating operations, two or more molecules of ricinoleic acid are caused to combine in a manner that a hydroxyl group in the chain of one molecule unites with a hydrogen atom contained in the carboxyl group of another molecule of ricinoleic acid to form a molecule of water. Therefore, as a result of the first heating operation, water is driven off as water vapor and the progress of the reaction can be ascertained by the amount of water which is driven off or by other means, such as, for example, by determining the acetyl and/or acid values. In this first heating operation the ricinoleic acid is converted into a poly acid (polyricinoleic acid), that is to say into an ester acid, or estolide. The chemical reaction involved in this production of ester acid or estolide may be represented by the following chemical equation:

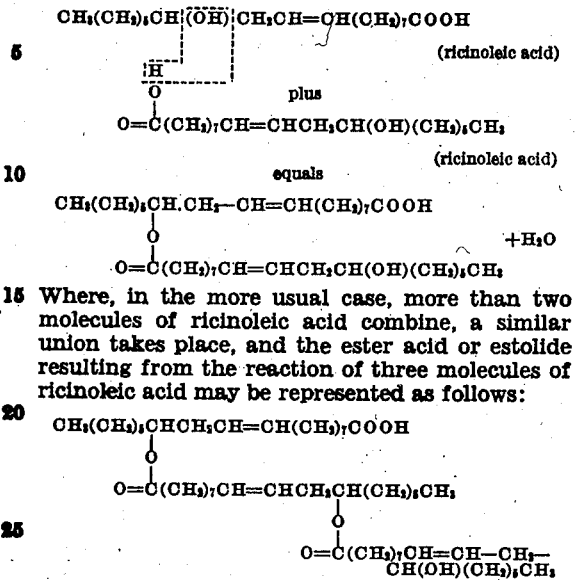

Where, in the more usual case, more than two molecules of ricinoleic acid combine, a similar union takes place, and the ester acid or estolide resulting from the reaction of three molecules of ricinoleic acid may be represented as follows:

$$CH_3(CH_2)_5CHCH_2CH=CH(CH_2)_7COOH$$
$$|$$
$$O=C(CH_2)_7CH=CHCH_2CH(CH_2)_5CH_3$$
$$|$$
$$O=C(CH_2)_7CH=CH-CH_2-CH(OH)(CH_2)_5CH_3$$

By maintaining the temperature during this first heating operation below 260°, for example, at 250° C., or by heating the ricinoleic acid in the first heating step to a temperature at which the ester acid or estolide forms, but which temperature does not exceed 260° C., the ricinoleic acid is practically all converted into ester acid or estolide by continuing the application of the temperature indicated; and the conversion occurs substantially without decomposition of the ester acid or estolide to form 9,11-octadecadiene 1-acid. Preferably a conversion temperature not exceeding 250° C. is employed in the first heating operation. As indicated above, the formation of the ester acid or estolide is accompanied by the formation of water, which, under the temperature employed, escapes as steam or water vapor from the mass being heated. Temperatures below 250° C. may be employed, for example, temperatures from 150° C. to 250° C., however, with temperatures lower than 250° C., the formation of the ester acid or estolide is slower and not so complete.

Besides the formation of estolide, as described in the preceding lines, other reactions may take place to a certain extent during the heating process. E. g. it may be, that in small amounts so-called lactones are formed, having by way of example the following formula:

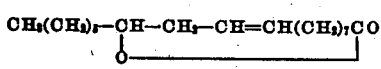

In the formation of these lactones from ricinoleic acid water is also split off.

The ester acid or estolide resulting from the first heating operation, either with or without prior cooling, is next subjected to a second heating operation at a more elevated temperature which brings about atomic and molecular rearrangement in the ester acid or estolide, resulting in the formation of 9,11-octadecadiene 1-acid. This second heating operation is conducted at a temperature above 270° C., for example, at temperatures between 270° C. and 350° C., but the second heating operation is preferably conducted at a temperature of about 290°–315° C. However, temperatures above 320° C. usually produce undesired polymerizations and decompositions. The range of 290°–315° C. is very effective in converting the ester acid or estolide into 9,11-octadecadiene 1-acid, since at that temperature very excellent yields of the 9,11-octadecadiene 1-acid are obtained, the losses due to undesired polymerization in the heating zone are low, and the 9,11-octadecadiene 1-acid may be distilled from the mass being heated as it is formed, practically pure and substantially free of ricinoleic acid and ester acid or estolide. The chemical reaction according to which the ester acid or estolide yields 9,11-octadecadiene 1-acid may be represented in the following manner:

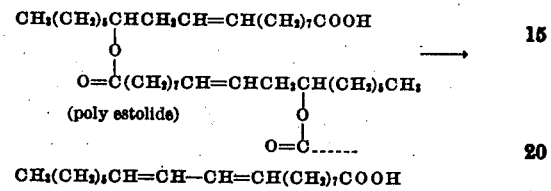

$$CH_3(CH_2)_5CH=CH-CH=CH(CH_2)_7COOH$$

9,11-octadecadiene 1-acid.

By first forming the ester acid or estolide under controlled temperature conditions and subsequently decomposing the ester acid or estolide also under controlled temperature conditions, it has been found that very pure and large yields of 9,11-octadecadiene 1-acid are attainable, so that this embodiment of the present invention affords a convenient method of preparing 9,11-octadecadiene 1-acid very economically on a large scale and substantially in pure condition.

It is clear, that it is not per se necessary to use as starting material for the second heating operation the estolide, prepared in the first heating. I may also use estolides, obtained from other sources or by other methods.

Whereas in the first heating operation mentioned above the temperature on an operating basis does not considerably exceed 250° C., and the temperature during the second heating operation is maintained above 270° C., it is to be understood that some small variations in these temperatures are permissible, considering that the temperature of 250° C. differs only by 20° from the temperature of 270° and that that difference in temperature approximately represents the difference between formation of ester acid or estolide on the one hand and 9,11-octadecadiene 1-acid on the other. That is to say, although these specific operating temperatures are described, they may vary more or less on one side or the other of the points given, provided that in the first heating step there is effective conversion of ricinoleic acid into a body for the most part consisting of ester acid or estolide and that the temperature in the second heating operation is sufficient to decompose the ester acid or estolide into 9,11-octadecadiene 1-acid. From the foregoing it is obvious that the temperature in the second heating operation must not exceed the decomposition temperature of 9,11-octadecadiene 1-acid. The purity of the 9,11-octadecadiene 1-acid as well as the percentages of yields thereof depend considerably on maintaining the temperature used in forming the ester acid or estolide in the first heating operation as far removed as practical from the temperature of conversion of ester acid or estolide to 9,11-octadecadiene 1-acid.

The first heating operation described above, by which ricinoleic acid is converted into an ester acid or estolide, may be conducted at atmospheric pressure, or superatmospheric pressure, or under reduced pressure or in an atmosphere of carbon dioxide or other inert gas. In these cases the heating of the ricinoleic acid may be conducted with or without an esterification catalyst, such as alumina, activated alumina, fuller's earth, silica gel, iron oxide, metallic iron, aluminum phosphate, metallic zinc, metallic tin, etc. The second heating operation, with separation of the catalyst from the oil, if desired, when a catalyst is present, is carried on under lowest pressure possible and below 30 m. m. of mercury absolute for example, under a pressure of 8 to 15 millimeters of mercury, and preferably at 10 millimeters of mercury absolute. The so called cathodic vacuum may be employed, if desired. Water vapor, benzol vapor, carbon dioxide, other inert vapor or gas, preferably steam, is passed through the material being heated in the second heating operation, to accelerate the carrying over of the vapors of 9,11-octadecadiene 1-acid to the condenser for the latter.

It is to be understood, that the temperature at which the estolide has to be heated in the distillation process, depends within the limits stated above to a certain degree on the pressure, under which the distillation is being carried out. The lower the pressure under which the distillation is taking place, the lower the distillation temperature may be. However, it is necessary to maintain the limits for the distillation temperature given above. The speed of distillation has to be such, that the decomposition of the estolide into the 9,11-octadecadiene 1-acid has sufficient time for taking place. In general, a rather low speed of distillation is desirable, in order to avoid the formation of by-products, that diminish the degree of purity of the 9,11-octadecadiene 1-acid, obtained in the process. If necessary the 9,11-octadecadiene 1-acid, obtained in the first distillation process, may be subjected to a second distilling and fractionating operation at reduced pressure in order to enhance the degree of purity. This second and, if necessary, following distilling operations may be carried out at a lower temperature than the first one, e. g. at the normal distillation temperature of the higher fatty acids. It stands to reason that this temperature may vary considerably according to the pressure under which the distillation is carried out. The lower this pressure, the lower the distillation temperature may be.

Although theoretically the distillation process may be carried out without obtaining any residue, all the ricinoleic acid present being finally converted into 9,11-octadecadiene 1-acid, in practice some residue is always left in the still. It may even be practicable to continue the distilling process, until the residue is still fairly high, because in this case the residue has useful properties, so that it may be utilized for special purposes. If e. g. the distillation process is continued until the residue is 30-20% of the original weight of the castor oil acid, the residue will be still a liquid, and may be esterified e. g. with glycerol or with another aliphatic polyhydric alcohol or with a mono alcohol, to give a product, that may be used in the manufacture of varnishes and the like.

The vessel in which the first heating operation described above is conducted may be connected at or near its bottom with a pipe which leads into a second heating vessel in which the second heating operation may be conducted, so that the product from the first heating stage can either be continuously or intermittently fed, by gravity, by suction or by pumping into the second heating stage. The heating vessel in which the second heating operation described above is performed is necessarily equipped with means to produce the reduced pressure desired and with condenser means for condensing the 9,11-octadecadiene 1-acid which distills over during the second heating operation. The condensed 9,11-octadecadiene 1-acid is practically pure, being substantially free of ricinoleic acid, esters of ricinoleic acid and estolide. If necessary, it may be redistilled and refractionated at reduced pressure, as described above, in order to still further enhance the degree of purity.

As pointed out by the embodiment of my process in which ricinoleic acid is subjected to two successive heating operations, it produces a purer product and gives better yields than the simpler form in which only one heating operation is applied. To a certain extent the yields of 9,11-octadecadiene 1-acid obtained and the degree of purity of this product depend on the duration of the first heating operation.

When the object in view is to obtain very efficient and large percentage yields of pure or relatively pure 9,11-octadecadiene 1-acid, the heating in the first heating operation described above is conducted for a long enough period of time to convert the ricinoleic acid mostly or completely to the ester acid or estolide of ricinoleic acid; but if the purity of the 9,11-octadecadiene 1-acid or its percentage of yield is not an essential requirement, the heating in the first heating operation may be conducted for any desired period of time depending upon yields of ester acid or estolide, or 9,11-octadecadiene 1-acid that are desired. The temperature and time of heating during the first heating operation are preferably respectively high and long enough to form ester acids or estolides of very high molecular weight, that is to say to cause the union of many molecules of ricinoleic acid in a chain by the hydroxyl group of one molecule combining with the carboxyl group of another, so that tetra-, penta-, hexa- and higher polyricinoleic acids or polyestolides are formed, according to the duration of the heating. This degree of condensation can be controlled and estimated by determining the acetyl or acid numbers or the quantity of water split off. The more the condensation has progressed, the lower will be the acetyl and acid numbers, while the quantity of water split off will be larger.

According to the present invention ester acids or estolides can be produced with practically zero acetyl number or value and of an acid number as low as 20. By suitably prolonging the heating in the first heating operation, ester acids or estolides having acid numbers lower than 50 and even lower than 30 can be obtained. The heating can be continued to bring down the acid number to 20, depending on the composition of the castor oil fatty acid. These ester acids or estolides are thick viscous liquids at room temperature (20°-25° C.), and are particularly useful in the preparation of 9,11-octadecadiene 1-acid as herein described. A product produced from ricinoleic acid, according to the present invention, by heating in the absence of catalyst, for about eight hours at about 250° C., had an acid number of 24.

If desired, after the first heating operation has been completed, and the ricinoleic acid converted into ester acid or estolide, the mass may be allowed to cool or the said mass may be cooled by cooling coils, and the above described second heating operation omitted, whereby a product consisting essentially of ester acid or estolide is obtained. Such a product may be used and sold as a distinct product, and the said product may be used as a means of providing 9,11-octadecadiene 1-acid in a reaction progressing at a temperature high enough to bring about its conversion into 9,11-octadecadiene 1-acid.

The 9,11-octadecadiene 1-acid produced by this process can be used for reaction with glycerol and phthalic anhydrid to form a resin, e. g., a normal "glyptal" resin. A process for making resins of this type with the aid of 9,11-octadecadiene 1-acid is described in my copending application, Serial No. 78,923, of even date and relating to: "Synthetic resins and methods for making the same." The estolide can be similarly used, or mixtures of the estolide with the 9,11-octadecadiene 1-acid, and/or other fatty acids. This process for making resins is described in my copending application Serial No. 71,316, dated March 27, 1936.

It is also possible to use mixtures of 9,11-octadecadiene 1-acid, produced by my process, and other fatty acids derived from drying, semi-drying or non-drying oils, in the manufacture of resins. It is to be understood, that the use of all these products is not restricted to the so called glyptal resins, but that they may be utilized also for the preparation of other types of resin, in which normally fatty acids or estolides are being used.

The 9,11-octadecadiene 1-acid or the estolide can also be used to produce the mono-, di- or tri-glycerides or similar esters with other polyhydric alcohols. These products can be used in making resins with polycarboxylic acids or anhydrids thereof, e. g. phthalic acid or its anhydrid.

It is also possible to use the products in question for other purposes, e. g. in making varnishes, lacquers and in general all products, for which linseed oil, wood oil and similar oils are usable.

The 9,11-octadecadiene 1-acid or the estolide or the esters of these products with glycerol or other polyhydric alcohols may be subjected to known processes, such as polymerization (bodying), oxidation (blowing), treatment with chlorine, sulphur, sulphur chloride, etc. Furthermore they may be siccativated with compounds of cobalt, manganese and other metals. These processes are carried out in a similar way as in the case of linseed oil, wood oil or similar oils or of the corresponding fatty acids.

By the term "estolide" used in the appended claims, I intend to include the compounds usually designated as estolides as well as compounds having the same formula as estolides except that the carboxyl group at one end of the chain of the estolide molecule has combined with the hydroxyl group at the other end of the chain with the formation of water, as well as mixtures of estolides and said last mentioned compounds, the said last mentioned compounds being produced, for example, at least at some of the temperatures lying within the range of 150 to 260° C., inclusive, at which temperatures ricinoleic acid, according to the present invention, is preliminarily heated before it is subsequently heated at a temperature above 270° C. to form 9,11-octadecadiene 1-acid.

I claim:

1. The process of preparing 9,11-octadecadiene 1-acid, which comprises subjecting ricinoleic acid to a temperature of 290–315° C.

2. The process of preparing 9,11-octadecadiene 1-acid which comprises subjecting ricinoleic acid to heating at a temperature between 150 to 250° C., inclusive, effective to convert the same to ester acid or estolide, the said heating being performed until the material being heated has an acid number not exceeding 50, and thereafter converting the latter material to 9,11-octadecadiene 1-acid by subjecting it to a temperature of 290°–315° C.

3. The process of preparing 9,11-octadecadiene 1-acid which comprises subjecting ricinoleic acid to a temperature between 150 to 260° C., inclusive, the said temperature being applied until the material so treated has an acid number not exceeding 50, and thereafter subjecting the said last mentioned material to distillation at reduced pressure at a temperature above 270° C. but below the decomposition temperature of 9,11-octadecadiene 1-acid, whereby 9,11-octadecadiene 1-acid is obtained as a distillate.

4. The process of preparing 9,11-octadecadiene 1-acid which comprises subjecting ricinoleic acid to a temperature between 150 and 250° C., inclusive, effective to form ester acid or estolide, the said temperature being applied until the material so treated has an acid number not exceeding 50, and thereafter subjecting the said last mentioned material to distillation at reduced pressure at a temperature of 290–315° C. whereby 9,11-octadecadiene 1-acid is obtained as a distillate.

5. The process of preparing 9,11-octadecadiene 1-acid which comprises subjecting ricinoleic acid to a temperature between 290–315° C. and subjecting this product to distillation at reduced pressure at a temperature between 290–315° C., whereby 9,11-octadecadiene 1-acid is obtained as a distillate.

6. A process of making 9,11-octadecadiene 1-acid which comprises heating ricinoleic acid to a temperature of about 250° C. to not over 260° C., until it has an acid number not exceeding 50 and heating said product to a temperature above 270° C., but not over about 315° C., while under an absolute pressure of not over 30 mm., to distill off 9,11-octadecadiene 1-acid, substantially free from ricinoleic acid.

7. As an intermediate product suitable for the preparation of 9,11-octadecadiene 1-acid, an estolide of ricinoleic acid, substantially free from unconverted ricinoleic acid, the same being a viscous liquid at room temperature, and which has an acid number below 30, said product yielding substantially pure 9,11-octadecadiene 1-acid by heating above 270° C.

8. Process for producing 9,11-octadecadiene 1-acid which comprises heating ricinoleic acid at a temperature not exceeding 260° C. effective to form an estolide of ricinoleic acid, said heating being continued at least until it is converted into a body for the most part consisting of an estolide of ricinoleic acid, and thereafter heating said body at a temperature above 270° C., but below the temperature at which 9,11-octadecadiene 1-acid decomposes, to form 9,11-octadecadiene 1-acid.

9. Process for producing 9,11-octadecadiene 1-acid which comprises heating ricinoleic acid at a temperature not exceeding 260° C. until it has an acid number below 50, and thereafter heating it under reduced pressure at a temperature in excess of 270° C., but below the temperature at which 9,11-octadecadiene 1-acid decomposes.

10. Process for producing 9,11-octadecadiene 1- acid which comprises heating to a temperature in excess of 270° C., but below the temperature at which 9,11-octadecadiene 1-acid decomposes, a body consisting at least for the most part of an ester acid or estolide of ricinoleic acid.

11. Process for producing 9,11-octadecadiene 1-acid which comprises heating to a temperature in excess of 270° C., but below the temperature at which 9,11-octadecadiene 1- acid decomposes, the estolide product obtained by heating ricinoleic acid, at a temperature not exceeding 260° C. effective to produce the ester acid or estolide of ricinoleic acid, until the said product has an acid number below 50.

12. Process for producing 9,11-octadecadiene 1-acid which comprises heating to a temperature in excess of 270° C., but below the temperature at which 9,11-octadecadiene 1-acid decomposes, the estolide product obtained by heating ricinoleic acid at a temperature not exceeding 260° C. effective to produce ester acid or estolide of ricinoleic acid until the acid number of said product is lower than 30.

13. Process for preparing 9,11-octadecadiene 1-acid which comprises subjecting ricinoleic acid to a temperature between 150 to 260° C., inclusive, in the presence of an esterification catalyst effective in causing the conversion of ricinoleic acid to an ester acid or estolide, said temperature being applied until the material so treated has an acid number not exceeding 50, and thereafter subjecting the said last mentioned material to a temperature above 270° C., but below the decomposition temperature of 9,11-octadecadiene 1-acid, to form 9,11-octadecadiene 1-acid from said material.

14. Process for preparing 9,11-octadecadiene 1-acid which comprises heating ricinoleic acid at a temperature not exceeding 260° C. until it is converted into an estolide resulting from the union of at least four molecules of ricinoleic acid, and heating said material at a temperature in excess of 270° C. but below the temperature at which 9,11-octadecadiene 1-acid decomposes.

15. Process for treating ricinoleic acid to convert it into an acid of a greater degree of unsaturation, said process comprising heating ricinoleic acid at a temperature not exceeding 260° C. effective to form an estolide resulting from the union of at least four molecules of ricinoleic acid, said heating being applied until an estolide resulting from the union of at least four molecules of ricinoleic acid is formed, and heating said material at a temperature in excess of 270° C. but below the temperature at which 9,11-octadecadiene 1-acid decomposes.

16. Process for preparing 9,11-octadecadiene 1-acid which comprises heating, at a temperature above 270° C., but below the temperature at which said acid decomposes, an estolide resulting from the union of at least four molecules of ricinoleic acid.

17. Process for preparing an acid of a greater degree of unsaturation than ricinoleic acid, which process comprises heating, at a temperature above 270° C., but below the temperature at which 9,11-octadecadiene 1- acid decomposes, an estolide resulting from the union of at least four molecules of ricinoleic acid.

REMMET PRIESTER.